United States Patent
Schmidt et al.

(10) Patent No.: US 7,617,562 B2
(45) Date of Patent: Nov. 17, 2009

(54) APPARATUS FOR CONTACTLESS CLEANING OF A CONVEYING ELEMENT AND ARRANGEMENT FOR TRANSPORTING AND/OR STORING OF ROD-SHAPED ARTICLES WITH AN APPARATUS FOR CONTACTLESS CLEANING OF A CONVEYING ELEMENT

(75) Inventors: Hans-Herbert Schmidt, Hamburg (DE); Knut Tracht, Neuwied (DE)

(73) Assignee: Hauni Maschinenbau AG, Hamburg (DE)

( * ) Notice: Subject to any disclaimer, the term of this patent is extended or adjusted under 35 U.S.C. 154(b) by 485 days.

(21) Appl. No.: 11/284,847

(22) Filed: Nov. 23, 2005

(65) Prior Publication Data

US 2006/0107968 A1    May 25, 2006

(30) Foreign Application Priority Data

Nov. 24, 2004    (DE) ................... 10 2004 057 445

(51) Int. Cl.
  *A47L 9/02*    (2006.01)
  *B65G 45/24*    (2006.01)
  *B08B 7/04*    (2006.01)
(52) U.S. Cl. .................. 15/309.1; 134/37; 198/495
(58) Field of Classification Search ............. 15/309.1, 15/309.2, 345; 134/1, 48, 37; 198/493–495
See application file for complete search history.

(56) References Cited

U.S. PATENT DOCUMENTS

| 3,365,857 | A | * | 1/1968 | Liedtke .................. 53/148 |
| 3,680,684 | A | * | 8/1972 | Purdy et al. ............. 198/495 |
| RE28,383 | E | * | 4/1975 | Rudszinat .............. 406/70 |
| 4,860,883 | A | | 8/1989 | Knaul et al. |
| 5,372,242 | A | | 12/1994 | McInnes et al. |
| 5,523,052 | A | * | 6/1996 | Bridges et al. ........... 422/22 |
| 5,542,525 | A | * | 8/1996 | Kornely ................. 198/495 |

(Continued)

FOREIGN PATENT DOCUMENTS

DE     3612490 A1    10/1986

(Continued)

OTHER PUBLICATIONS

Expanded Search Report, dated Nov. 6, 2008 for EP Patent Application No. 05090324.

*Primary Examiner*—David B Thomas
(74) *Attorney, Agent, or Firm*—Venable LLP; Robert Kinberg; Ryan M. Flandro

(57) ABSTRACT

The invention concerns an apparatus for the contactless cleaning of a conveying element which is designed to receive rod-shaped articles in the tobacco-processing industry, including at least one ionising element for removing electrostatic charges on the surfaces of the conveying element to be cleaned, at least one rotating compressed-air nozzle for loosening and removing contaminants located on surfaces of the conveying element, and a suction device for extracting the contaminated outgoing air, characterized in that associated with the apparatus is a housing for forming a cleaning chamber at least partially shielded from the environment, whereby the cleaning chamber has an inlet opening and an outlet opening for the conveying element to be cleaned, such that upper side and lower side of the conveying element are surrounded. Furthermore, the invention concerns an arrangement for transporting and/or storing rod-shaped articles with an apparatus for contactless cleaning with the above-mentioned characteristics.

16 Claims, 6 Drawing Sheets

U.S. PATENT DOCUMENTS

| | | | | |
|---|---|---|---|---|
| 5,609,820 A | * | 3/1997 | Bridges et al. | 422/23 |
| 5,613,594 A | * | 3/1997 | Kootsouradis | 198/495 |
| 6,050,392 A | * | 4/2000 | Straub | 198/495 |
| 6,367,613 B1 | * | 4/2002 | Montgomery | 198/495 |
| 6,490,746 B1 | * | 12/2002 | Ernst et al. | 15/1.51 |
| 6,543,078 B1 | * | 4/2003 | Ernst et al. | 15/1.51 |
| 6,656,017 B2 | * | 12/2003 | Jackson | 451/39 |
| 6,902,630 B2 | * | 6/2005 | Ernst et al. | 134/37 |
| 2002/0155792 A1 | * | 10/2002 | Jackson | 451/39 |
| 2005/0199471 A1 | * | 9/2005 | Barrett | 198/495 |

FOREIGN PATENT DOCUMENTS

| | | |
|---|---|---|
| DE | 39 42 422 A1 | 6/1991 |
| DE | 297 19 651 U1 | 7/1998 |
| DE | 201 06 122 U1 | 12/2001 |
| DE | 696 19 216 T2 | 2/2002 |
| DE | 101 55 292 A1 | 5/2003 |
| DE | 101 63 762 A1 | 7/2003 |
| EP | 0 581 143 B1 | 2/1994 |
| EP | 0 909 592 B1 | 4/1999 |
| EP | 1 445 218 A1 | 8/2004 |
| WO | WO 97/06082 A1 | 2/1997 |

* cited by examiner

APPARATUS FOR CONTACTLESS CLEANING OF A CONVEYING ELEMENT AND ARRANGEMENT FOR TRANSPORTING AND/OR STORING OF ROD-SHAPED ARTICLES WITH AN APPARATUS FOR CONTACTLESS CLEANING OF A CONVEYING ELEMENT

CROSS-REFERENCE TO RELATED APPLICATION

This application claims the priority of German Patent Application No. 10 2004 057 445.6 filed Nov. 24, 2004, the subject matter of which is incorporated herein by reference. The disclosure of all U.S. and foreign patents and patent applications mentioned below are also incorporated herein by reference.

BACKGROUND OF THE INVENTION

The invention concerns an apparatus for the contactless cleaning of a conveying element which is designed to receive rod-shaped articles in the tobacco-processing industry, including at least one ionizing element for removing electrostatic charges on the surfaces of the conveying element which are to be cleaned, at least one rotating compressed-air nozzle for loosening and removing contaminants located on surfaces of the conveying element, and a suction device for extracting the contaminated outgoing air. Furthermore, the invention concerns an arrangement for transporting and/or storing rod-shaped articles in the tobacco-processing industry, including an endlessly rotating conveying element which has a full strand provided with articles and an empty strand without articles, a guide element which is arranged below the conveying element for guiding and/or supporting it, and an apparatus for cleaning the conveying element, whereby the apparatus for cleaning is arranged in the region of the empty strand.

Apparatuses and assemblies of this kind are used for many purposes in the tobacco-processing industry. In the manufacture of cigarettes or the like, tobacco sticks, filter rods, cigarettes or the like are transported, stored, transferred or otherwise conveyed. This purpose is served by conveying elements which can be designed as chains, belts or otherwise. Typical storage assemblies of the ORBIS and VARIOS type are described in detail in the applicant's European documents EP 0 581 143 B1 and EP 1 445 218 A1, respectively.

The conveying elements are at least partially supported and/or guided by a guide element which is arranged below the conveying element. During transport, storage or the transfer of rod-shaped articles, the conveying element is soiled by abrasion of the conveying element itself, residues of the articles located on the conveying element, dust from the environment and in particular also charcoal granules. Particularly the removal of the charcoal granules upon changing brands, but also maintenance of the mobility of the conveying element, necessitates cleaning of the conveying element. It is therefore known that apparatuses for cleaning the conveying elements can be provided. Contactless cleaning apparatuses, for example, electrostatic cleaning apparatuses, with the characteristics mentioned hereinbefore have proved to be particularly effective here. These are arranged in the region of an empty strand of the conveying element.

The known apparatuses for cleaning the conveying element have, however, the drawback that they are of open design. This means that in particular rotating compressed-air nozzles and the suction device have a direct effect on the environment. In other words, the compressed-air nozzles blow into the environment the dirt particles loosened from the conveying element. This can firstly lead, for example, to articles which are located on the full strand being blown down off the latter secondly, the articles in the vicinity but also the conveying element itself are again subjected to the contaminated air. The cleaning operation is, to put it another way, uncontrolled, as e.g. dirt particles can also drop onto elements located below the empty strand, e.g. the full strand or other components of these or other apparatuses.

SUMMARY OF THE INVENTION

It is therefore the object of the present invention to provide an apparatus for cleaning a conveying element which allows reliable and safe cleaning. Furthermore, it is the object of the invention to propose an arrangement for transporting and/or storing rod-shaped articles which ensures safe and reliable cleaning of the conveying element.

This object is achieved by an apparatus with the characteristics mentioned hereinbefore by the fact that associated with the apparatus is a housing for forming a cleaning chamber at least partially shielded from the environment, wherein the cleaning chamber has an inlet opening and an outlet opening for the conveying element to be cleaned, such that upper side and lower side of the conveying element are surrounded. With this apparatus, the actual cleaning operation is carried out shielded from the environment. Encapsulation of the cleaning apparatus by the housing allows, in a simple and effective manner, protection of the environment from the outgoing air which is swirled up and contaminated by the compressed-air nozzles and the suction device. Furthermore, the housing ensures that dirt particles loosened by the cleaning operation and falling down are caught and subjected to forced guidance and above all carried away in a controlled fashion.

In a preferred development of the invention, the ionising element has at least two ionising rods, whereby the ionising rods are oriented with their longitudinal extent parallel to the conveying element in the direction of travel thereof. Due to this design, a cleaning zone of maximum length is achieved in a narrow space.

Advantageously, in the region of the inlet opening and the outlet opening of the cleaning chamber are arranged sealing means which, in a particularly preferred development for complete sealing of the cleaning chamber, are adapted to the contour of the conveying element which is movable through the cleaning chamber. The result is a virtually closed system in which the incoming air, which is conducted into the cleaning chamber as compressed air by means of the compressed-air nozzles, and the outgoing air circulate in closed circuits. With this measure, the environment is protected in a particularly effective manner from loosened and swirled-up dirt particles.

Preferably, the guide element is at least partially interrupted in the region of the cleaning chamber. As a result, an additional cleaning effect is obtained by the fact that additional turbulence can be generated, such that the conveying element can be subjected to the cleaning compressed air from below as well.

BRIEF DESCRIPTION OF THE DRAWINGS

Further preferred and advantageous characteristics and developments are apparent from the subsidiary claims and the description. Particularly preferred embodiments of the invention are described in more detail with the aid of the attached drawings. The drawings show:

DETAILED DESCRIPTION OF THE INVENTION

The apparatus shown, preferably as part of an arrangement which is only indicated for transporting and/or storing rod-shaped articles, serves for the contactless cleaning of conveyor chains.

Figure 1:
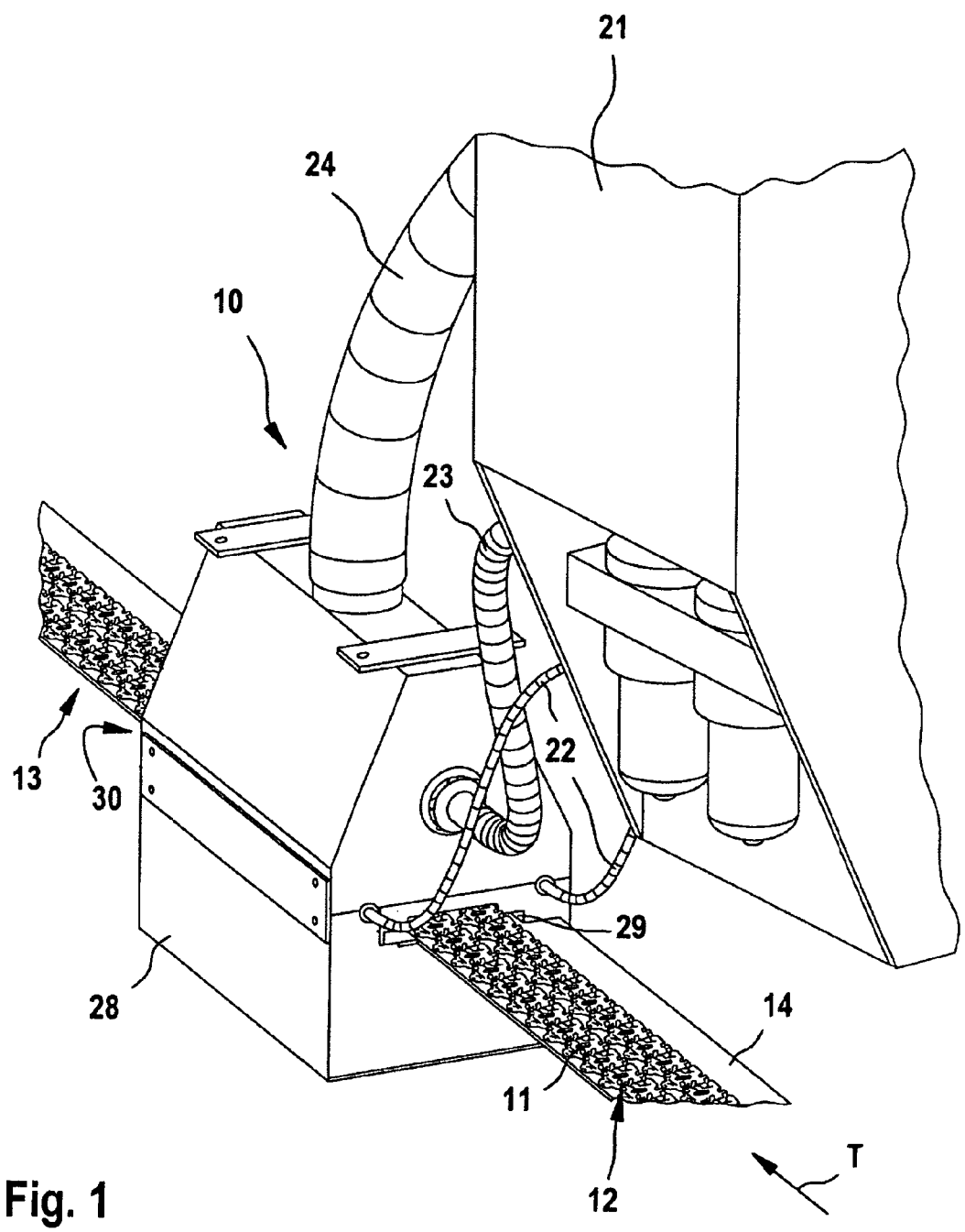
FIG. 1 a perspective view of a schematic drawing of the apparatus for cleaning with a conveyor chain running through the cleaning chamber, FIG. 2 an enlarged representation of the apparatus according to FIG. 1 with no housing cover, FIG. 3 a front view of the apparatus, FIG. 4 a sectional view along section B-B according to FIG. 3, FIG. 5 a side view of the apparatus, FIG. 6 an enlarged representation of the region of entry of the conveyor chain into the cleaning chamber, FIG. 7 the front view according to FIG. 3 with no front wall, and FIGS. 8a+b different positionings of the apparatus according to FIG. 1 by the example of a storage arrangement.

In FIG. 1 is shown an apparatus 10 for the contactless cleaning of a conveying element 12 designed as a conveyor chain 11. The apparatus 10 usually forms part of an arrangement which, in the embodiment described, is designed to transport and/or store rod-shaped articles in the tobacco-processing industry, e.g. filter cigarettes. For this purpose the arrangement comprises the endlessly rotating conveyor chain 11 which includes a full strand and an empty strand. The full strand is the section of the conveyor chain 11 provided with articles. The empty strand, given reference number 13 in FIG. 1, is the section of the conveyor chain 11 which is free from articles. The conveyor chain 11 is preferably made of plastic. Other usual materials can, however, be used as well. Furthermore, the arrangement includes a guide element 14 which is arranged below the conveyor chain 11 and serves to guide and/or to support the conveyor chain 11. The guide element 14 is preferably also made of plastic. It can also be formed from metal or composite materials. In the latter case, a guide element 14 made, for example, of metal is provided with a plastic surface.

The apparatus 10 includes an ionising element 15 which in the embodiment shown has two ionising rods 16, 17. The ionising rods 16, 17 are oriented with their longitudinal extent parallel to the conveyor chain 11 in the direction of travel or transport T thereof. The ionising rods 16, 17 are arranged at a distance from the conveyor chain 11 above and slightly laterally offset from the latter. They have so-called ionising tips 31, 32 over their whole length in the longitudinal direction. These ionising tips 31, 32 are oriented radially and obliquely to the conveyor chain 11. This means that the tips 31, 32 of the ionising rods 16, 17 are directed at an angle onto the conveyor chain 11, such that the whole width of the conveyor chain 11 can be ionised by the mutually opposed ionising rods 16, 17. The distance between the ionising rods 16, 17 and the conveyor chain 11 is variable and depends on various other parameters. Without the support of the compressed air from the compressed-air nozzles 18, the distance is e.g. max. 100 mm. With the support of the compressed air from the compressed-air nozzles 18, the distance can also be up to 500 mm. Other distances are, however, possible too.

Furthermore, at least one rotating compressed-air nozzle 18 and a suction device 19 form part of the apparatus 10. Preferably and shown in FIG. 2, however, the apparatus 10 has at least two units 25 with two compressed-air nozzles 18 each, which are of rotating design. The two units 25 with the two compressed-air nozzles 18 each are arranged between the ionising rods 16, 17 and one behind the other in the direction of travel T of the conveyor chain 11. The rotating drive of the compressed-air nozzles 18 is effected optionally via a drive (not shown) or by means of the inflowing compressed air in conjunction with the arrangement and orientation of the compressed-air nozzles 18 themselves, this being after the fashion of a compressed-air motor.

Figure 4:
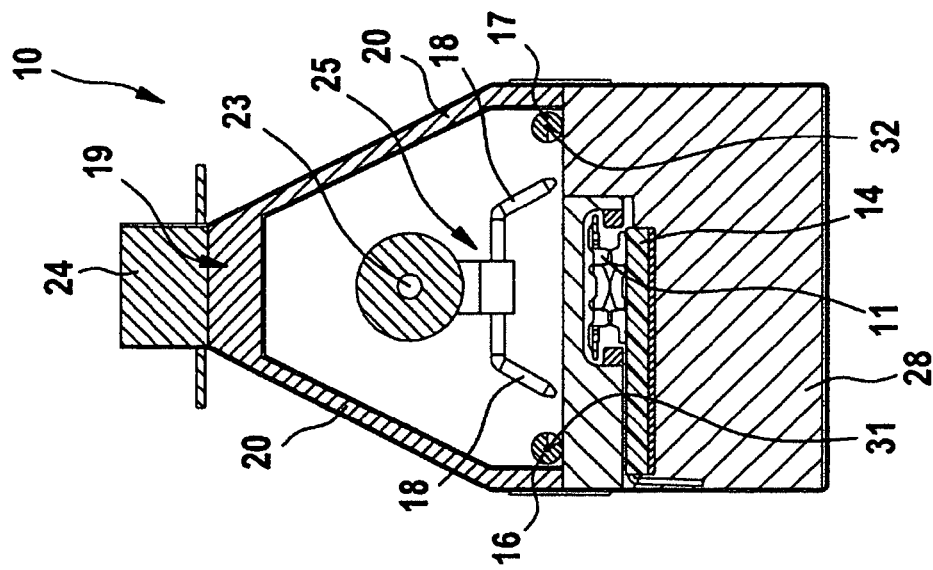
Figure 3:
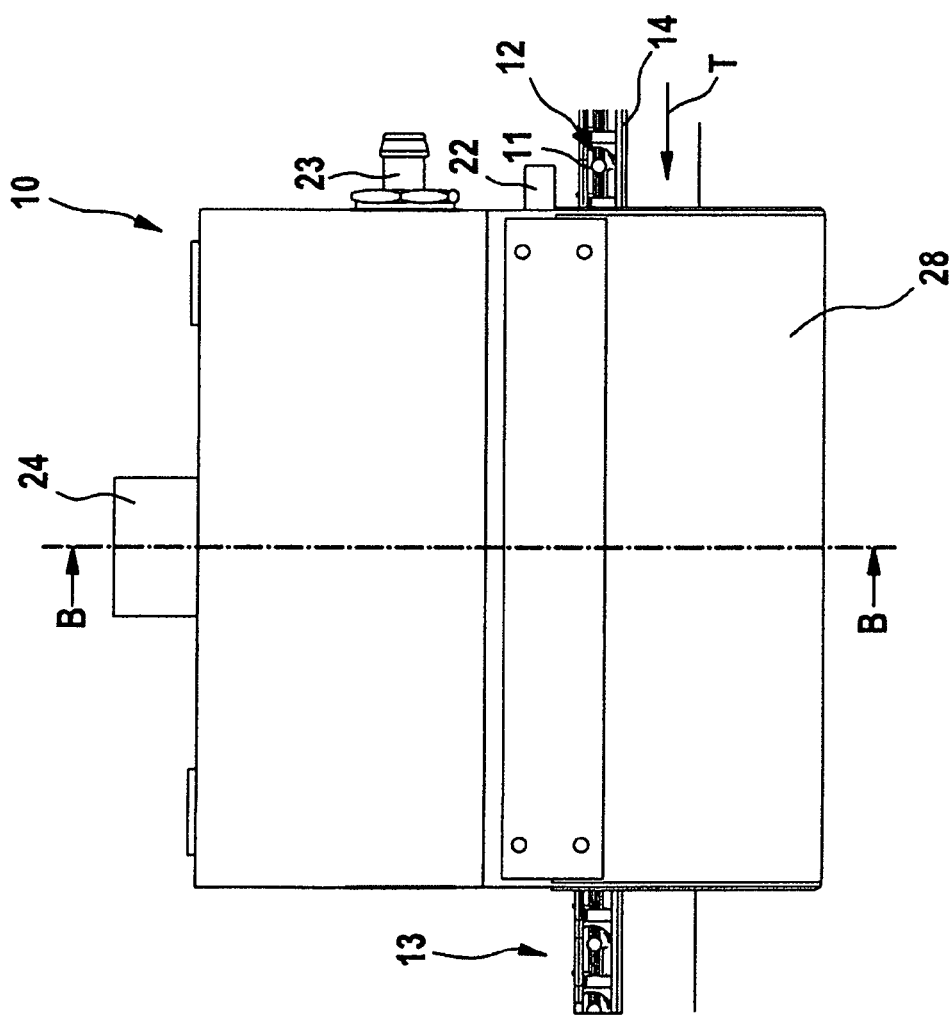
Figure 5:
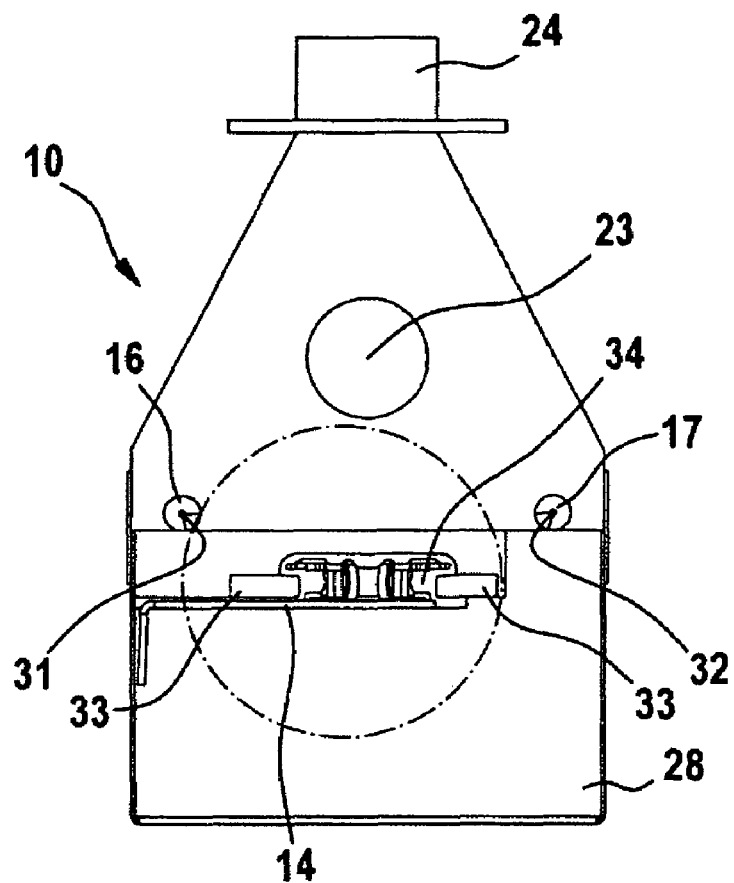

The suction device 19 includes at least one, but preferably several channels 20 which surround the compressed-air nozzles 18 and the ionising rods 16, 17 in a ring or hood shape (see in particular FIG. 4). In other words, the channels 20 surround the units 25 and the ionising rods 16, 17 at the sides and top, so that shielding from the environment is ensured. At the bottom, in the direction of the conveying element 12 or conveyor chain 11 to be cleaned, the channels 2D, the ionising rods 16, 17 and the units 25 lie exposed or open.

The ionising rods 16, 17, the compressed-air nozzles 18 and the suction device 19 are connected to a common unit 21. The ionising rods 16, 17 are connected via wires 22 to an ionising voltage supplier of the unit 21. The compressed-air nozzles 18 are connected via pipes 23 to a compressed-air supplier of the unit 21. The suction device 19 or its channels 20 are connected via pipes 24 to a vacuum supplier of the unit 21.

To form a cleaning chamber 27, a housing 28 is associated with the apparatus 10. The housing 28 directly adjoins the channels 20 or the walls forming them, producing the cleaning chamber 27 which is encapsulated or at least partially partitioned off from the outside. The housing 28 has an inlet opening 29 and an outlet opening 30 for the conveyor chain 11. The conveyor chain 11 is movable through the cleaning chamber 27. In the embodiment shown, the actual apparatus 10 is arranged above the empty strand 13. The housing 28, through which the empty strand 13 is guided for cleaning purposes, is arranged essentially below the empty strand 13, so that particles dropping down can be collected. Positioning of the apparatus 10 below and/or laterally of the empty strand 13 is also possible. In all embodiments, depending on the positioning, the housing 28 surrounds both the lower side and the upper side of the conveying element 12 or of the empty strand 13 of the conveyor chain 11.

Figure 6:
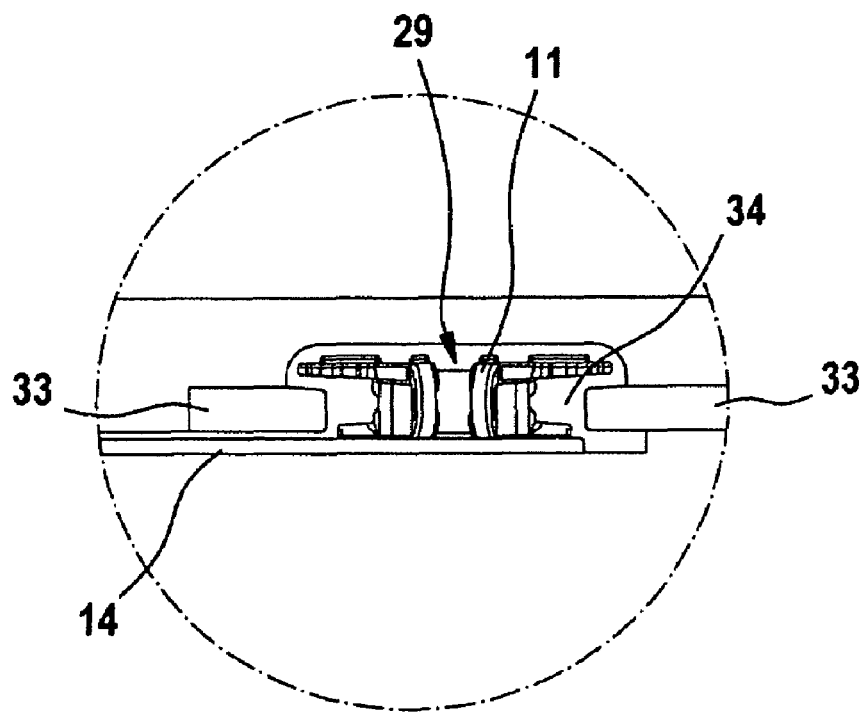

In the region of the inlet opening 29 and the outlet opening 30 are provided sealing means 33. The sealing means 33 shield the cleaning chamber 27 outwardly from the environment. Sealing lips, brush seals or other common seals can be used as the sealing means 33. The sealing means 33 engage laterally in horizontally extending grooves 34 in the conveyor chain 11 (see in particular FIG. 6). Sealing means 33 whose contour is adapted to the contour of the conveyor chain 11 are preferred, however, so that almost complete sealing off of the cleaning chamber 27 from the environment is ensured. In the assembled state, that is, when the apparatus 10 with the housing 28 is installed, a closed system is then provided for the cleaning chamber 27. To put it another way, a closed circuit is formed for the incoming air (as compressed air through the compressed-air nozzles 18) and the outgoing air.

Figure 7:
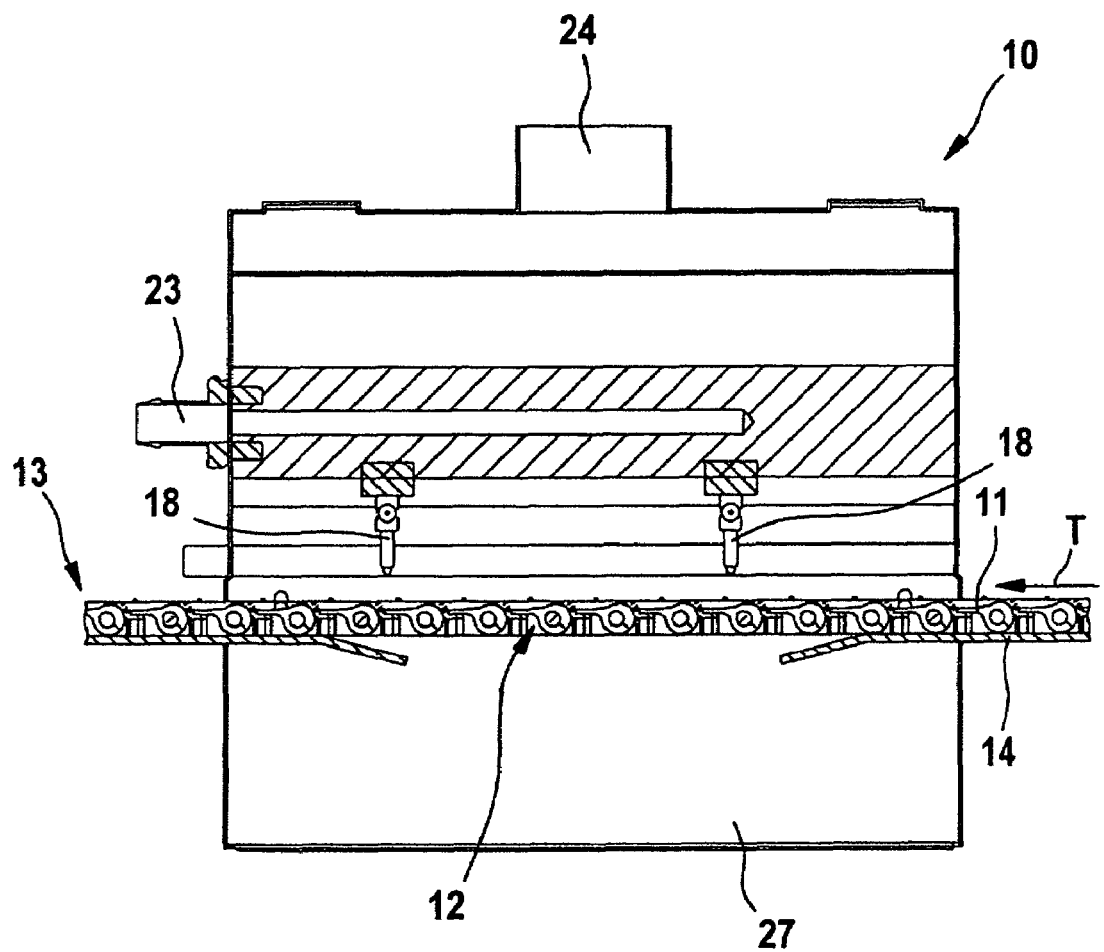

In a preferred development (according to FIG. 7), the guide element 14 is at least partially interrupted in the region of the cleaning chamber 27. In other words, in the embodiment shown the conveyor chain 11 hangs free in this region. But the interruption can also be produced by apertured plates, spaced-apart guide rails or the like.

Figure 8A:
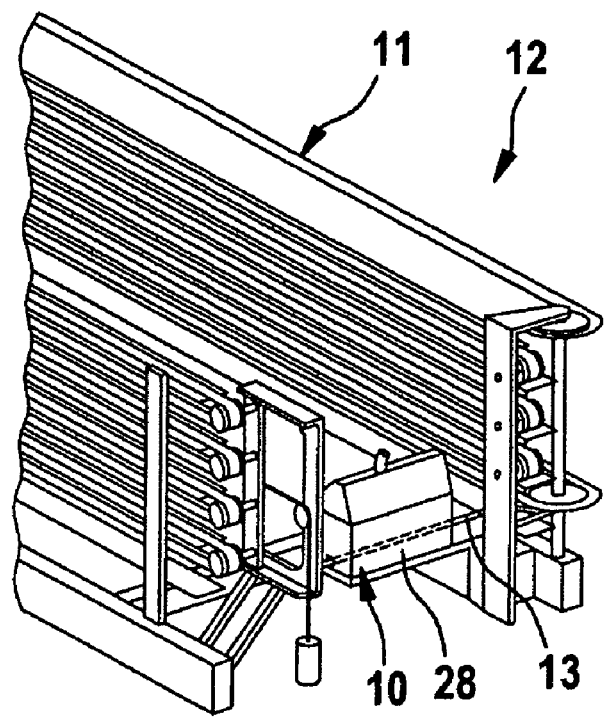
Figure 8B:
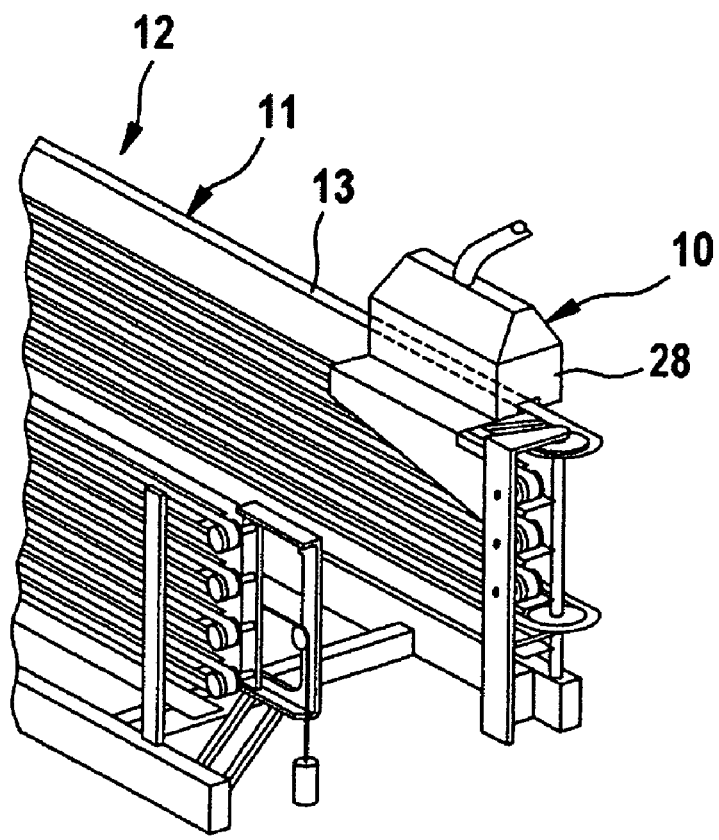

In FIG. 8 can be seen different positions of the apparatus 10 within an arrangement. The apparatus 10 in FIG. 8a is arranged between two guide zones of a storage device (as described in the aforementioned EP 1 445 218 A1) in which the empty strand 13 is guided, whereby the apparatus 10 is located above the empty strand 13 and the housing 28 at least partially surrounds or encloses the empty strand 13 on all sides. In the arrangement according to FIG. 8b, the apparatus 10 is arranged above a guide zone of the storage device. The conveyor chain 11 itself is, in accordance with the representation according to FIG. 8a, arranged within the housing 28 or guided through it.

In one embodiment, not shown explicitly, the apparatus 10 can also be connected to a control system. By means of the control system, automated cleaning can be carried out, for example, as a function of the degree of contamination which is definable by empirical values and/or measuring means. The control system can be used to control and/or regulate essential parameters which influence cleaning, e.g. compressed-air power, vacuum power, speed of rotation of the compressed-air nozzles 18. The apparatus 10 can also be connected by its channels 20 or pipes 24 to a (central) dust extraction system.

Figure 2:
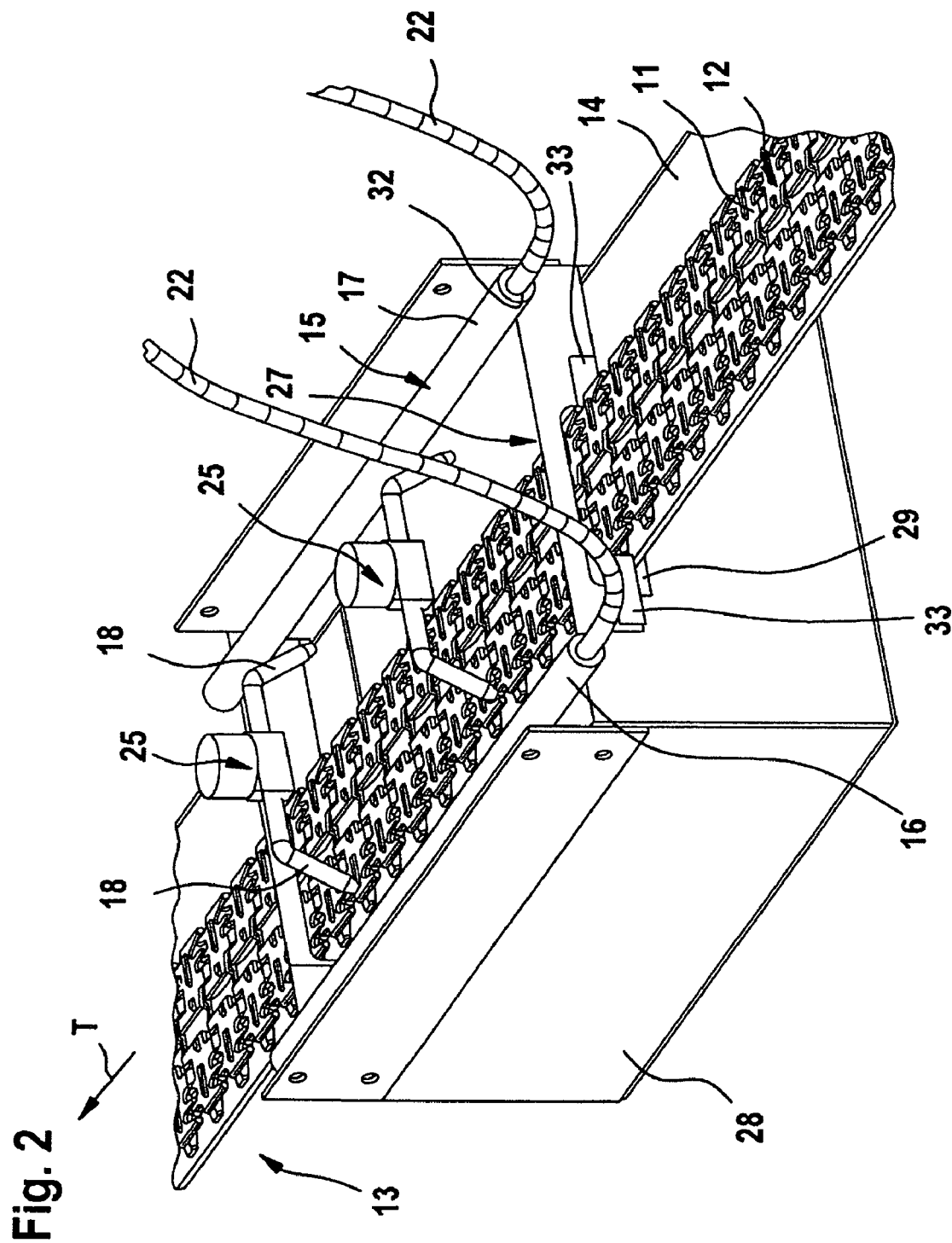

Below, the principle of the method is described in more detail with the aid of FIG. 2. The empty strand 13 is fed into the apparatus 10 or, to be more precise, into the housing 28 and moved in the direction of transport T. The apparatus 10 is set in operation optionally continuously or cyclically. The ionising rods 16, 17 are provided with a voltage via the wires 22, so that electrostatic charges on the surface of the conveyor chain 11 are removed. The rotating compressed-air nozzles 18 generate via the pipes 23 a turbulent air stream which can be applied continuously or in pulsed fashion. As a result, the dust particles and other contaminants are collected, swirled up and removed. Due to the at least partially open guide element 14 in the region of the cleaning chamber 27, the compressed air also passes under the empty strand 13, so that the conveyor chain 11 is also cleaned from below and from the side, inter alia by reflection of the compressed air on the housing wall. By the suction device 19, the contaminated outgoing air is extracted through the channels 20 via the pipe 24 and optionally delivered to a dust separator. Both the compressed air and the outgoing air in this case circulate in a closed circuit, as the sealing means 33 essentially prevent entry of air into the cleaning chamber 27 and exit of air from the cleaning chamber 27.

Instead of the conveyor chain 11, belts or other known conveying elements 12 can also be cleaned by means of the apparatus.

What is claimed is:

1. An apparatus for the contactless cleaning of a conveying element designed to receive rod-shaped articles in the tobacco-processing industry, the apparatus comprising:
    at least one ionizing element for removing electrostatic charges on surfaces of the conveying element to be cleaned, wherein the at least one ionizing element comprises at least two ionizing rods oriented with their longitudinal extent parallel to the conveying element in a direction of travel T of the conveying element,
    at least two units arranged between the at least two ionizing rods and one behind the other in the direction of travel T of the conveying element, wherein each unit includes at least two rotating compressed-air nozzles for loosening and removing contaminants located on the surfaces of the conveying element,
    a suction device for extracting contaminated outgoing air,
    a housing for forming a cleaning chamber at least partially shielded from the environment, wherein the cleaning chamber has an inlet opening and an outlet opening for the conveying element to be cleaned, such that an upper side and a lower side of the conveying element are surrounded, wherein the at least one ionizing element and the at least two units are disposed within the housing and the suction device is coupled to the housing, and
    seals arranged in a region of the inlet and outlet openings.

2. The apparatus according to claim 1, for complete sealing of the cleaning chamber, the seals are adapted to the contour of the conveying element which is movable through the cleaning chamber.

3. The apparatus according to claim 1, wherein the ionizing rods are each provided in the longitudinal direction with a radially oriented ionizing tip directed towards the conveying element.

4. The apparatus according to claim 1, wherein the distance between the ionizing rods and the conveying element is variable.

5. The apparatus according to claim 4, wherein the distance between the ionizing rods and the conveying element is variable between about 20 mm and about 500 mm.

6. The apparatus according to claim 1, wherein the apparatus can be operated cyclically.

7. The apparatus according to claim 1, wherein the apparatus is connected to a control system for automated control and/or regulation of parameters which influence cleaning.

8. The apparatus according to claim 7, wherein the parameters which influence cleaning include compressed air power, vacuum power, speed of rotation of the compressed-air nozzles, or cleaning interval as a function of the degree of contamination.

9. The apparatus according to claim 1, wherein the apparatus is connected to a central dust extraction system.

10. An arrangement for transporting and/or storing rod-shaped articles in the tobacco-processing industry, comprising:
    an endlessly rotating conveying element having a full strand provided with articles and an empty strand without articles,
    a guide element arranged below the conveying element for guiding and/or supporting the conveying element, and
    the apparatus for cleaning the conveying element according to claim 1, wherein the apparatus is arranged in a region of the empty strand.

11. The arrangement according to claim 10, wherein the arrangement has a closed circuit for incoming air and the outgoing air.

12. The arrangement according to claim 10, wherein the conveying element is a conveyor chain made of plastic.

13. The arrangement according to claim 10, wherein at least a side of the guide element facing towards the conveying element or the conveyor chain is made of plastic.

14. The arrangement according to claim 10, wherein the guide element is at least partially interrupted in the region of the cleaning chamber.

15. The arrangement according to claim 10, wherein the apparatus for cleaning is arranged above the empty strand.

16. The arrangement according to claim 10, further comprising a dust separator.

* * * * *

UNITED STATES PATENT AND TRADEMARK OFFICE
CERTIFICATE OF CORRECTION

PATENT NO. : 7,617,562 B2
APPLICATION NO. : 11/284847
DATED : November 17, 2009
INVENTOR(S) : Schmidt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Nineteenth Day of October, 2010

David J. Kappos
*Director of the United States Patent and Trademark Office*